R. Jennings.
Making Auger-Blanks.

N° 55,498. Patented Jun. 12, 1866.

Witnesses:

Inventor;
Russell Jennings
per Munn & Co
Attorneys

UNITED STATES PATENT OFFICE.

RUSSELL JENNINGS, OF DEEP RIVER, CONNECTICUT.

IMPROVEMENT IN DIES FOR SWAGING THE ENDS OF AUGER-BLANKS.

Specification forming part of Letters Patent No. 55,498, dated June 12, 1866; antedated December 19, 1865.

*To all whom it may concern:*

Be it known that I, RUSSELL JENNINGS, of Deep River, in the county of Middlesex and State of Connecticut, have invented a new and useful Improvement in Swaging the Ends of the Blanks of Screw-Augers preparatory to forming the heads thereon; and I do hereby declare that the following is a full, clear, and exact description thereof, which will enable those skilled in the art to make and use the same, reference being had to the accompanying drawings, forming part of this specification, in which—

Figure 3:
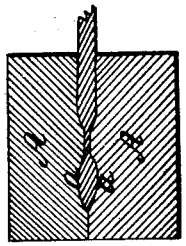
Figure 1:
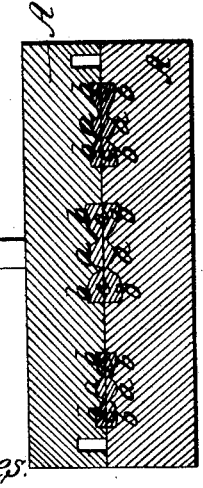
Figure 2:
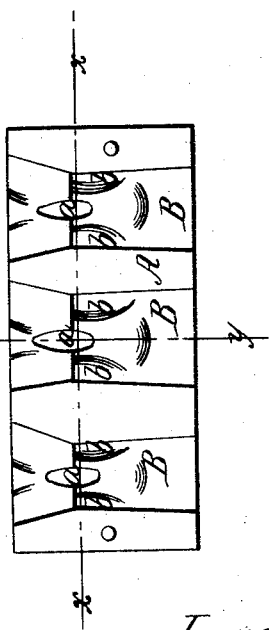

Figure 1 is a longitudinal section of the dies employed for carrying out my invention, $x \ x$, Fig. 2, indicating the line of section. Fig. 2 is a plan or top view of the lower die; Fig. 3, a transverse vertical section of Fig. 1, taken in the line $y \ y$, Fig. 2.

Similar letters of reference indicate corresponding parts.

This invention relates to a new and improved mode of swaging the ends of the blanks of screw-augers preparatory to forming the heads thereon, and is more especially designed to facilitate the construction or manufacture of screw-augers as patented by me January 30, 1855, and reissued October 3, 1865.

The object of the invention is to swage the ends of the blanks in such a form that the heads or cutting-ends of the auger may be subsequently made or produced without welding any portions thereto, the metal being so disposed or distributed by the swaging as to admit of the spur, pintle, lips, and cutting-edges of the auger being all produced at one operation.

A A represent two metal blocks, each of which has one or more dies, B, sunk in it. These dies have a sunken portion, $a$, to form the portion for the pintle, and they have also a sunken portion, $b$, at each side of the inner part of the portion $a$, the space between the sunken portions $b \ b$ being more or less raised, as may be required.

The dies of the two blocks are precise counterparts of each other; but they may vary in size with respect to pairs, in order to make augers of different sizes.

In consequence of having the dies constructed as shown quite thick portions of metal are formed at the sides of the blank, as shown at $c \ c$, Fig. 1, and a proper portion of metal allowed for the pintle. The thick portions $c \ c$ admit of the lips and cutting-edges of the auger, commonly termed the "head," being swaged at one operation and without lapping or welding. This is an important feature, for where the metal is lapped to form the cutting-edges or head of the auger a weld or faulty joint is necessarily formed, and these are frequently very imperfect.

Thus, by swaging the end of the blank so that the metal will be disposed or distributed at the proper parts, the head of the auger may be formed or swaged at one operation and out of one and the same piece of metal, so that all welding is avoided and a great saving of time effected in the manufacture of augers.

Having thus described my invention, I claim as new and desire to secure by Letters Patent—

The swaging of the ends of auger-blanks so as to have thick masses or portions $c \ c$ at the sides thereof, with a central thick portion for the pintle, by means of dies constructed, substantially as described, for the purpose of enabling the heads of augers to be formed or swaged at one operation, and so avoid all welding and joining of parts, as set forth.

RUSSELL JENNINGS.

Witnesses:
M. M. LIVINGSTON,
WM. E. LYON.